(12) United States Patent
Freedman et al.

(10) Patent No.: US 7,941,414 B2
(45) Date of Patent: May 10, 2011

(54) EXECUTING NON-BLOCKING PARALLEL SCANS

(75) Inventors: Craig Steven Freedman, Sammamish, WA (US); Gargi Sur, Redmond, WA (US); Gang He, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 11/729,225

(22) Filed: Mar. 28, 2007

(65) Prior Publication Data

US 2008/0243768 A1    Oct. 2, 2008

(51) Int. Cl.
*G06F 7/00* (2006.01)
*G06F 17/30* (2006.01)

(52) U.S. Cl. .................... 707/703; 707/716; 707/802

(58) Field of Classification Search ............... 707/104.1, 707/802, 703, 716
See application file for complete search history.

(56) References Cited

U.S. PATENT DOCUMENTS

| | | | |
|---|---|---|---|
| 6,009,265 A | 12/1999 | Huang et al. | |
| 6,349,310 B1 | 2/2002 | Klein et al. | |
| 6,526,163 B1 * | 2/2003 | Halmann et al. | 382/128 |
| 6,691,166 B1 | 2/2004 | Gasior et al. | |
| 6,804,678 B1 | 10/2004 | Luo et al. | |
| 6,816,854 B2 | 11/2004 | Reiner et al. | |
| 6,910,032 B2 | 6/2005 | Carlson et al. | |
| 7,103,590 B1 | 9/2006 | Murthy et al. | |
| 2002/0091694 A1 | 7/2002 | Hrle et al. | |
| 2003/0014393 A1 | 1/2003 | Kabra et al. | |
| 2003/0055890 A1 * | 3/2003 | Senda | 709/203 |
| 2003/0174354 A1 * | 9/2003 | Oteki | 358/1.13 |
| 2005/0131893 A1 | 6/2005 | Von Glan | |
| 2006/0074874 A1 | 4/2006 | Day et al. | |
| 2006/0080285 A1 | 4/2006 | Chowdhuri | |
| 2006/0218123 A1 | 9/2006 | Chowdhuri et al. | |

OTHER PUBLICATIONS

International Search Report and Written Opinion Received for PCT Application No. PCT/US2008/057918, mailed on Jul. 31, 2008, 10 pages.
Zhou, et al., "Improving Database Performance on Simultaneous Multithreading Processors", Date: 2005, http://www.vldb2005.org/prgram/paper/tue/p49-zhou.pdf.

* cited by examiner

*Primary Examiner* — Kuen S Lu

(57) ABSTRACT

Executing non-blocking parallel scans is disclosed. One embodiment includes determining if one or more threads have completed scanning one or more assigned portions of a first division of the data set. The identified one or more threads are directed to immediately scan the portions of a next division of the data set that are identified as available for scanning, upon completing the scanning of assigned portions of the first division of the data set. The threads are directed to immediately scan portions of the next division of the data set free of a need to wait until other threads complete scanning assigned portions of the first division of the data set.

17 Claims, 14 Drawing Sheets

EXECUTING NON-BLOCKING PARALLEL SCANS

BACKGROUND

Databases can be used to maintain a collection of records or other information such that they can be easily accessed, updated and managed. Relational database systems store data as tables. Logically a table is a set as there is no order to rows that are contained therein. Relational databases can be managed via database management systems.

Many database management systems have the capacity to build indexes to their tables. A table with an index stores rows in a particular order. Database systems use indexes to optimize data access and to provide fast access to sorted data. For example, in a database that stores sales data, a sales table can be created that stores information related to the particular products that have been purchased by a particular customer. If the sales table has an index for the customer, the database system can efficiently answer a query such as "find all sales to customer X" without having to process all of the customer records and can answer a query such as "sort all sales by customer" without actually having to sort the data.

Database management systems are able to scan a table (with or without an index) using multiple CPUs or threads. This type of scan is referred to as a "parallel scan." During a parallel scan, a database management system can assign data pages or ranges of values from the table to respective threads. The assignment of the ranges of values to the threads can be dynamic and on-demand. In particular, whenever a thread completes scanning its current assignment of pages, it requests the next available set of pages (or ranges) to continue scanning. A result of this feature is that work can be automatically load balanced across threads.

Many conventional database management systems support horizontal partitioning (or fragmentation) of database tables. When a table is horizontally partitioned, it is divided into several smaller physical storage units. Each "partition" of a "partitioned table" stores a disjoint set of rows. By combining the rows from all of the partitions, the original data can be reconstructed. To determine to which partition a row belongs a "partition function" can be applied to one or more columns of the table (the "partition keys"). The output of this function is called the "partition id."

In one conventional system, table partitioning is implemented by adding special case code throughout the query processor. This code provides partitioning capability and the capability to treat partitioned tables differently from non-partitioned tables. As such, different plans are provided for partitioned and non-partitioned tables. The result is more complex query plans and an increase in code complexity.

In addition, in such systems, parallel scans on partitioned tables may not be supported. If a scan of a partitioned table using multiple threads is desired, concurrent serial scans of multiple partitions are performed. Such scans use one worker thread per partition, and partitions are assigned to threads as illustrated in FIG. 1A. This assignment can be dynamic and on-demand. However, the algorithm involved does not always perform well. If the number of partitions to be scanned is small relative to the number of threads involved all of the threads may not be kept busy (see FIG. 1A). Furthermore, if one partition is larger than the others (see partition 2 in FIG. 1A), the thread assigned to this partition can end up much busier than the other threads and can dominate execution time. However, it is important to note that even where uniform partition sizes are employed, if the number of partitions is not an even multiple of the number of threads, all threads may not be kept busy for the duration of the scan.

Query plans with partitioned tables achieve parallelism by scanning multiple partitions concurrently (e.g., by performing concurrent serial scans of multiple partitions). The maximum degree of parallelism for scans of partitioned tables is effectively limited by the number of partitions to be scanned. In the extreme case, if the query processor dynamically eliminates all but one partition, a serial scan of this partition can result.

To improve performance, many database management systems, issue background disk reads before the data is actually needed. This process, which is called "read ahead" (some systems use the term "prefetching") reduces the likelihood that threads will need to wait for a disk read to complete its operations and enables a single thread to issue reads simultaneously against multiple disks. It should be noted that parallel scans enable central processing unit (CPU) parallelism as multiple threads are allowed to process data from a single table concurrently while read-ahead operations enable input-output (I/O) parallelism as they allow data pages to be read from multiple disks concurrently.

Conventional database management systems have several shortcomings. Many are only able to perform a parallel scan of a single range or partition at a time. When processing a query plan that involves a parallel scan of multiple ranges or partitions of the same table, some conventional database management systems must wait for all threads participating in the parallel scan to complete the scan of the current range or partition before proceeding to the next one. In particular, one or more threads that complete their assigned portions for a range or partition get blocked and have to wait until other threads complete the scan of their assigned portions of the same range or partition before proceeding. The effect of this is that system utilization drops as the system completes the scan of one range or partition and prepares to begin the scan of the next range or partition.

Database queries such as "find all sales to customers X, Y, or Z" scan multiple ranges of a table. As discussed above, some conventional database management systems employ an index on customer to satisfy such a query. Such systems use the index to perform three lookups, one for each of the customers X, Y, and Z. The three lookups are referred to as ranges since each lookup scans a range of table rows.

In at least one conventional system a parallel scan for each of these three lookups can be performed. This can be implemented as three independent and parallel scans. First, all of the threads perform a parallel scan of the first range X. Then, all of the threads perform a parallel scan of the second range Y. Finally, all of the threads perform a parallel scan of the third range Z. During each parallel scan, the database management system assigns pages or sub-ranges dynamically to the threads as discussed above. A shortcoming of such scans is illustrated in FIG. 1B which characterizes a scan of two ranges X and Y. As shown in FIG. 1B, when there are no more pages remaining in a range assigned to one thread, the scanning system waits for the other participating threads to finish scanning pages assigned for that range. When all of the threads are idle and the parallel scan of the range is complete (see FIG. 1B), the parallel scan of the next range can be begun.

Some conventional database management systems stop I/O read-ahead operations when they reach the end of a range or partition as shown in FIG. 1C. This limitation exacerbates the problems discussed above by increasing the length of time it takes to begin scanning the next range or partition.

If an index is range partitioned on the leading index key, a scanning system can scan return data from this index in sorted order by scanning the partitions sequentially using a serial scan. However, because the "parallel scan" algorithm used in conventional systems such as described above scans multiple partitions of the table simultaneously (with each partition assigned to a different thread), a "parallel scan" by such systems does not return data in sorted order.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One embodiment manages the executing of non-blocking scans by determining if threads have completed assigned scan tasks in a first division of a data set and directing the threads to immediately commence the scan of assigned portions of the next division of the data set to be scanned. The threads can immediately commence the scan of assigned portions of the next division of the data set to be scanned free of a need to wait until other threads complete scanning assigned portions of the first division of the data set. Scan performance is improved as threads are not forced to wait until other threads complete assigned scans in a particular division.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While embodiments will be described herein, it will be understood that these descriptions are not intended to limit the disclosed subject matter to specific embodiments. On the contrary, the embodiments are intended to cover alternatives, modifications and equivalents, which may be included within the spirit and scope of the subject matter disclosed herein as defined by the appended claims. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1A:
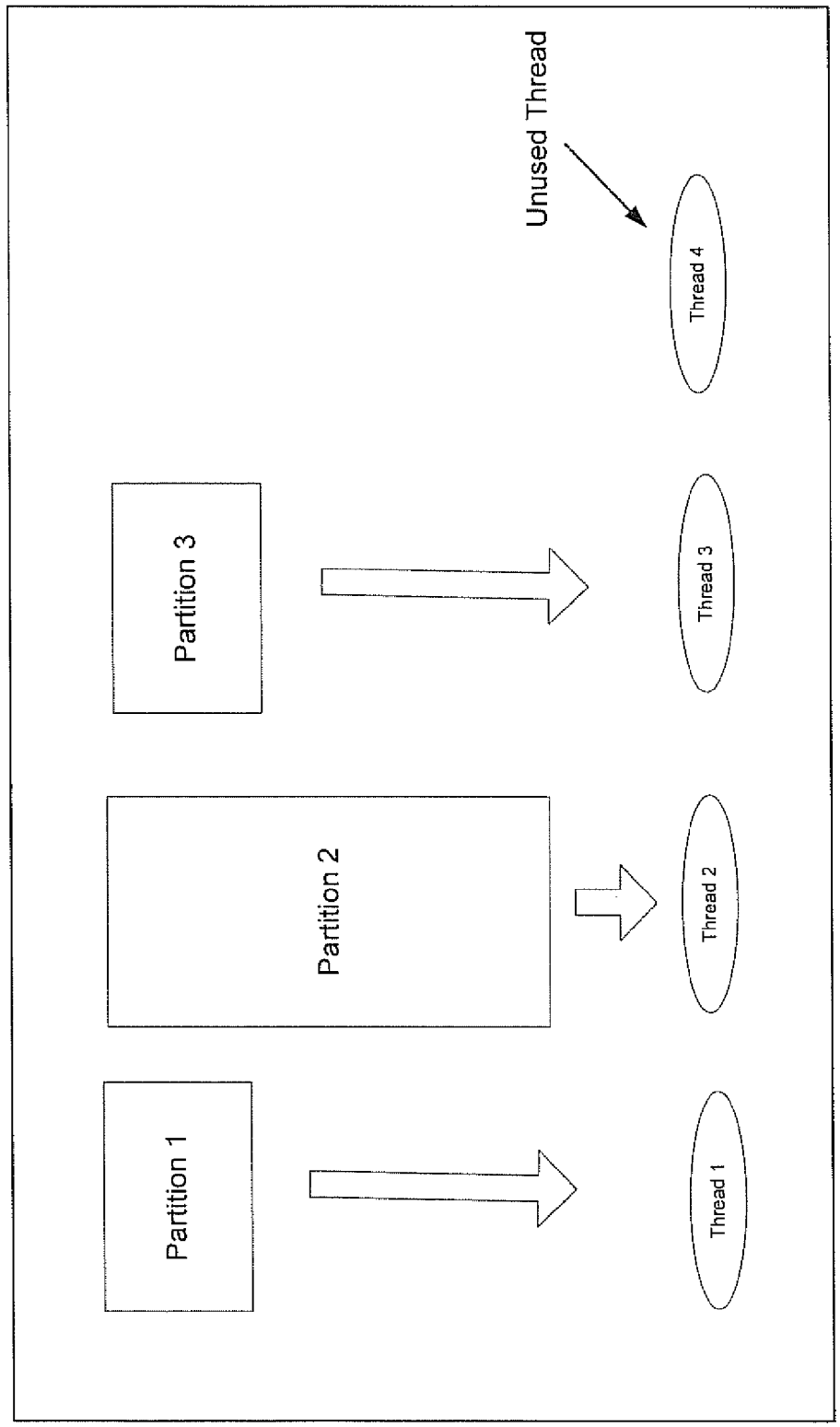
FIG. 1A shows a conventional method of assigning partitions to threads for a scan of a partitioned table using multiple threads.
Figure 1B:
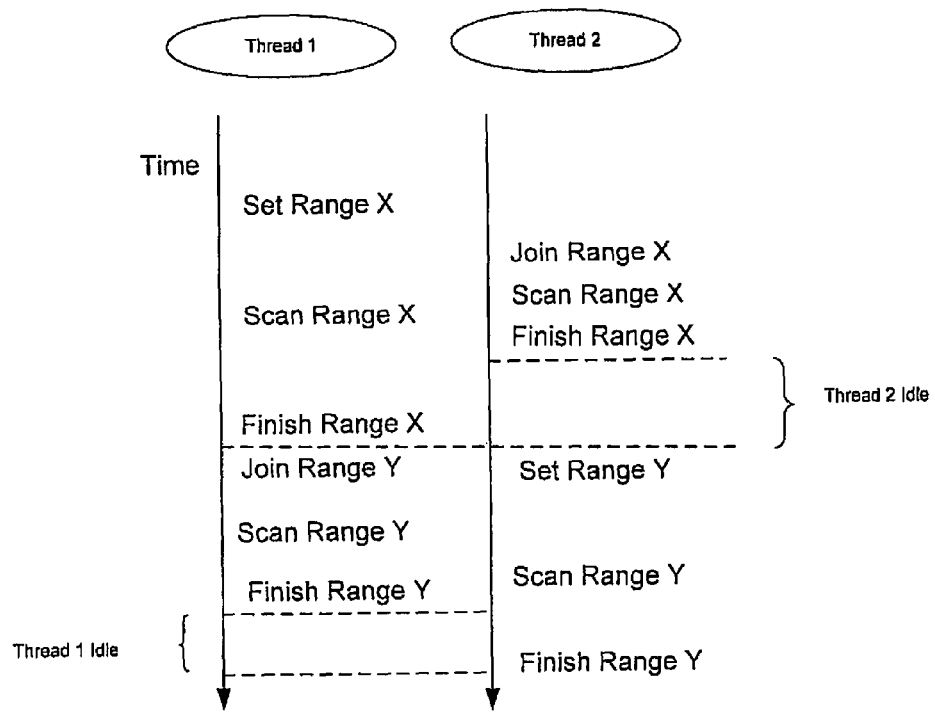
FIG. 1B shows a conventional method for executing a parallel scan of a data range from a data table.
Figure 1C:
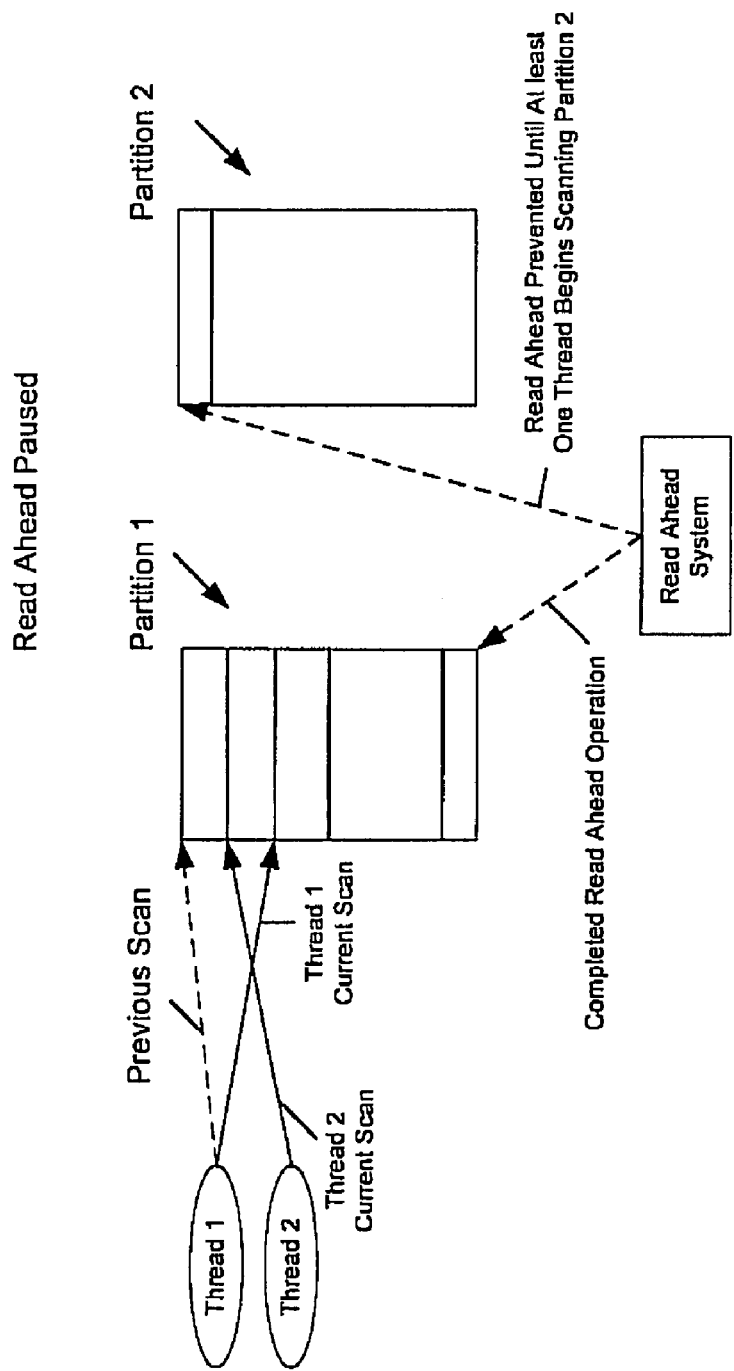
FIG. 1C illustrates the operation of a conventional I/O read-ahead operation when it reaches the end of a range or partition.
Figure 2A:
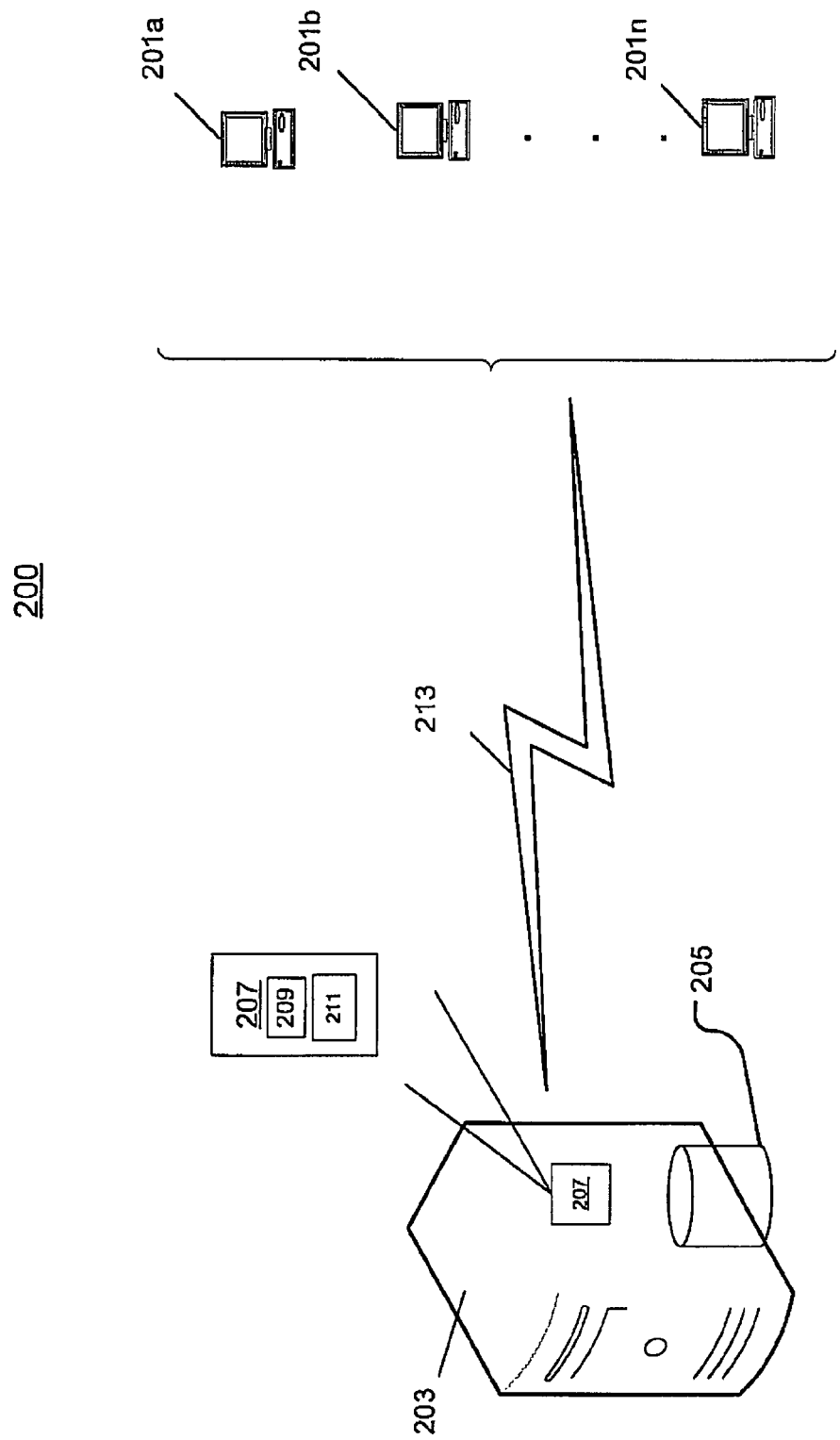
FIG. 2A shows an exemplary operating environment of a system for executing non-blocking parallel scans according to one embodiment.

Exemplary Operating Environment of System for Executing Non-Blocking Parallel Scans FIG. 2A shows an exemplary operating environment 200 of a system 209 for executing non-blocking parallel scans according to one embodiment. System 209 improves the uniformity of scan performances by maintaining the unblocked utilization of threads that participate in a scan, throughout duration of the scan. More specifically, system 209 directs threads participating in a scan of a data set, upon completing the scan of assigned portions of a division of the data set, to immediately commence the scan of a next division of the data set. In FIG. 2A, operating environment 200 includes client computer systems 201a-201n, network server 203, database 205, database management system 207, system 209, read-ahead system 211 and network link 213.

Referring to FIG. 2A, network server 203 services client computer systems 201a-201n and houses database 205. In one embodiment, network server 203 can be coupled to client computer systems 201a-201n through network link 213. Network link 213 can include either a wired or a wireless network. In one embodiment, network server 203 can include a mainframe computer. In other embodiments, network server 203 can include other types of computer systems.

Database 205 maintains a collection of information (e.g., records) that can be readily accessed, managed and updated. In one embodiment, the aforementioned collection of information can be organized into data tables. In one embodiment, database 205 can be accessed, managed and updated through queries issued via database management system 207. In one embodiment, these operations can involve the scanning of a database table or the scanning of an index to a database table.

In one embodiment, database 205 can reside on network server 203. In another embodiment, database 205 can reside at a location that is remote from network server 203. In one embodiment, database 205 can be housed on a mainframe computer server. In other embodiments, database 205 can be housed on one or more computers of a distributed workstation system or reside on a personal computer (not shown).

Figure 2B:
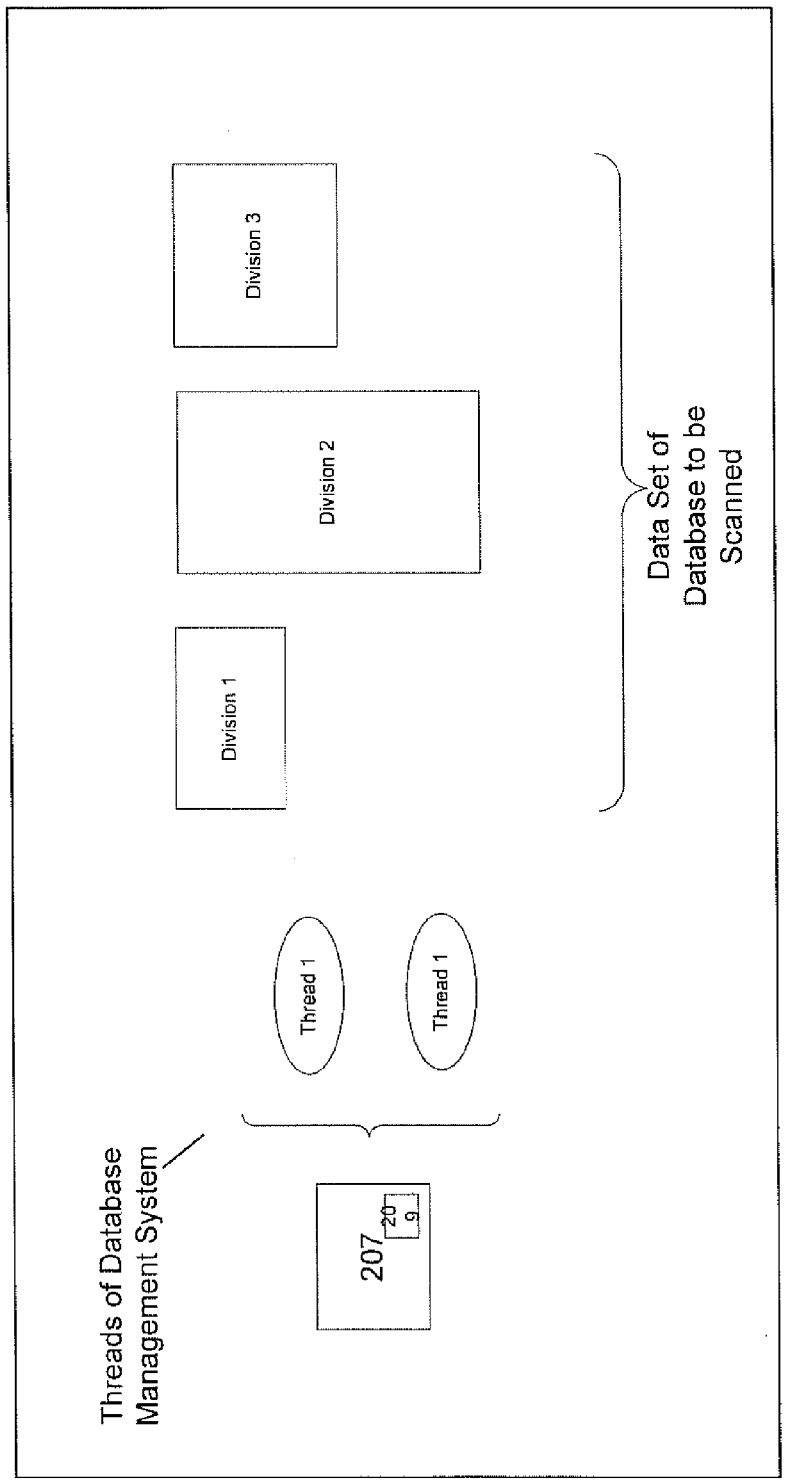
FIG. 2B illustrates how a plurality of threads can be employed in the parallel scanning of a data set of database according to one embodiment.

Database management system 207 can include a program application that manages database 205. In one embodiment, the managing of database 205 can involve the scanning of database files. In one embodiment, data management system 207 can split a scanning operation into threads or simultaneously running tasks. These threads can be employed in the parallel scanning of a data set of database 205 such as is shown in FIG. 2B (see thread 1 and thread 2). As discussed herein, system 209, associated with database management system 207, operates to effect non-blocking parallel scans by threads (e.g., thread 1 and thread 2) of the scanning operations of database management system 207.

Figure 2C:
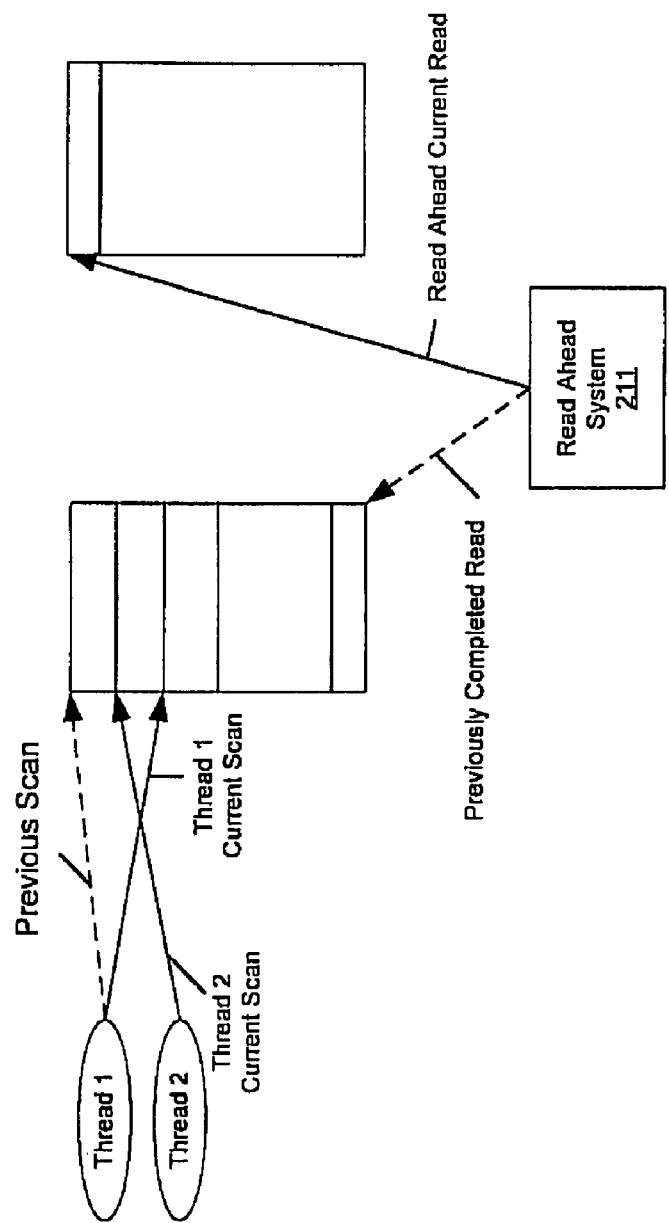
FIG. 2C illustrates how a read-ahead operation can immediately proceed from the completion of read-ahead operations in one division of a data set to a next division of the data set according to one embodiment.

Database management system 207 can also include read-ahead system 211. In one embodiment, read-ahead system 211 retrieves data to be scanned by threads contributing to a scan of a data set before it may be needed. In one embodiment, a read-ahead operation can immediately proceed from the completion of read-ahead operations in one division of a data set to execute read-ahead operations in a next division of the data set (e.g., a range or partition) as illustrated in FIG. 2C. This feature of the read-ahead operations of one embodiment is different from that of conventional systems. In some conventional systems, read ahead processes are required to wait until all threads scanning a division of a data set (e.g., a range or a partition) to complete their scans of the division of the data set before the read-ahead process can proceed to the next division to be scanned.

Referring again to FIG. 2A, system 209 coordinates non-blocking parallel scans of data, such as by data management system 207. System 209 directs threads that contribute to the parallel scanning of a data set, upon the completion of the scanning of their assigned portions of a division of the data set, to immediately begin the scan of assigned portions of another division of the data set. In one embodiment, the scan of assigned portions of a next division to be scanned can be commenced without the need to wait for other threads to complete the scanning of their assigned portions of the preceding division. In one embodiment, the operation of system 209 ensures an efficient utilization of thread capacity, as none of the threads contributing to the parallel scan of a data set, is allowed to have its operation blocked, during the scan.

In one embodiment, system 209 can be included as a part of database management system 207. In another embodiment, system 209 can be separate from but operate cooperatively with database management system 207. System 209 can include hardware and/or software which implements an algorithm for executing the operations of system 207 discussed herein.

Operation

FIGS. 2D-2H illustrate the character of scans performed by process threads of data management system 207 under the direction of system 209 for executing non-blocking scans. More specifically, FIGS. 2D-2H illustrate the character of various types of scans performed by data management system 207 under the direction of system 209. In the examples illustrated in FIGS. 2D-2H, the data set is divided into ranges or partitions. It should be appreciated that the number of ranges and/or partitions shown in FIGS. 2D-2H are only exemplary and the scans discussed below can be performed regardless of the number of ranges or partitions involved.

Parallel Range Scan

Figure 2D:
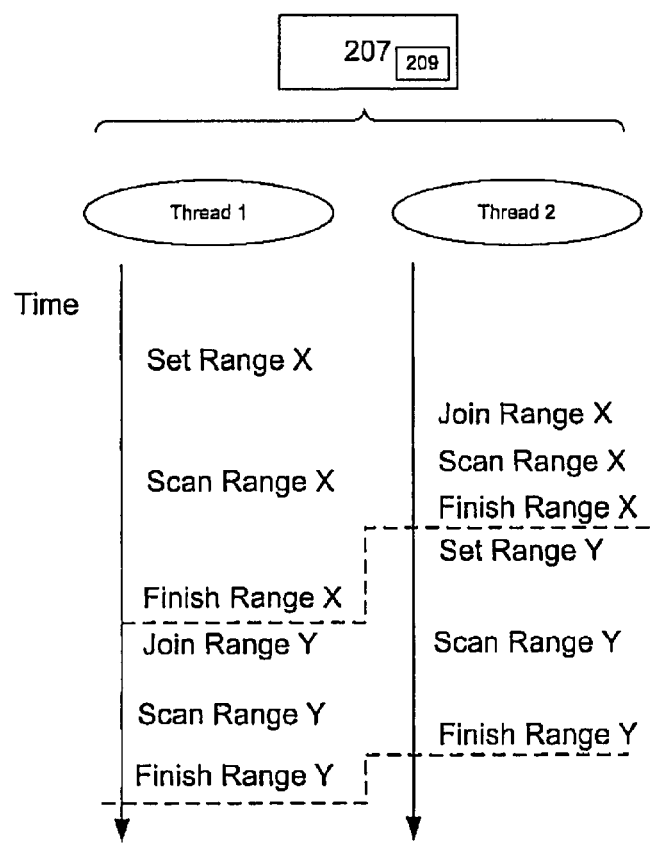
FIG. 2D illustrates the manner in which a parallel range scan involving the parallel scanning of two ranges of data of a data set by two threads is executed according to one embodiment.

FIG. 2D illustrates the manner in which a parallel range scan involving the parallel scanning of two ranges of data, X and Y, of a data set by two threads, 1 and 2, of a scanning operation of data management system 207 under the direction of system 209 is executed according to one embodiment. As illustrated in FIG. 2D, threads participating in the scan, upon completion of the scan of assigned portions of a first range, immediately proceed to scan assigned portions of the next range.

Referring to FIG. 2D, the parallel scanning of the data set comprised of ranges X and Y is initiated when thread 1 commences a scan of its assigned portion of range X (see Set Range X in FIG. 2D). Subsequently, thread 2 commences a scan of its assigned portion of range X (See Join Range X in FIG. 2D). In the example illustrated in FIG. 2D, thread 2 completes the scan of its assigned portion of range X prior to the time at which thread 1 completes the scan of its assigned portion of range X. Upon completing the scan of its assigned portion of range X, thread 2 immediately commences a scan of its assigned portion of range Y (see Set Range Y in FIG. 2D). Thereafter, upon completing the scan of its assigned portion of range X, thread 1 immediately commences a scan of its assigned portion of range Y (see Join Range Y in FIG. 2D). In the FIG. 2D example, thread 2 completes the scan of its assigned portion of range Y prior to the time at which thread 1 completes the scan of its assigned portion of range Y. The parallel scanning of the data set is completed when thread 1 completes the scan of its assigned portion of range Y.

In one embodiment, as shown in the above discussion, the need for the database management system to wait for all threads to complete scanning one range before beginning the next range is eliminated. In one embodiment, as discussed above, as soon as a thread finishes scanning the portion of a range that it has been assigned (and there are no more pages remaining in that range to be assigned), the thread can begin a parallel scan of the next range. As other threads finish scanning the previous range, they can join the existing parallel scan of the next range.

Parallel Partitioned Table Scan

Figure 2E:
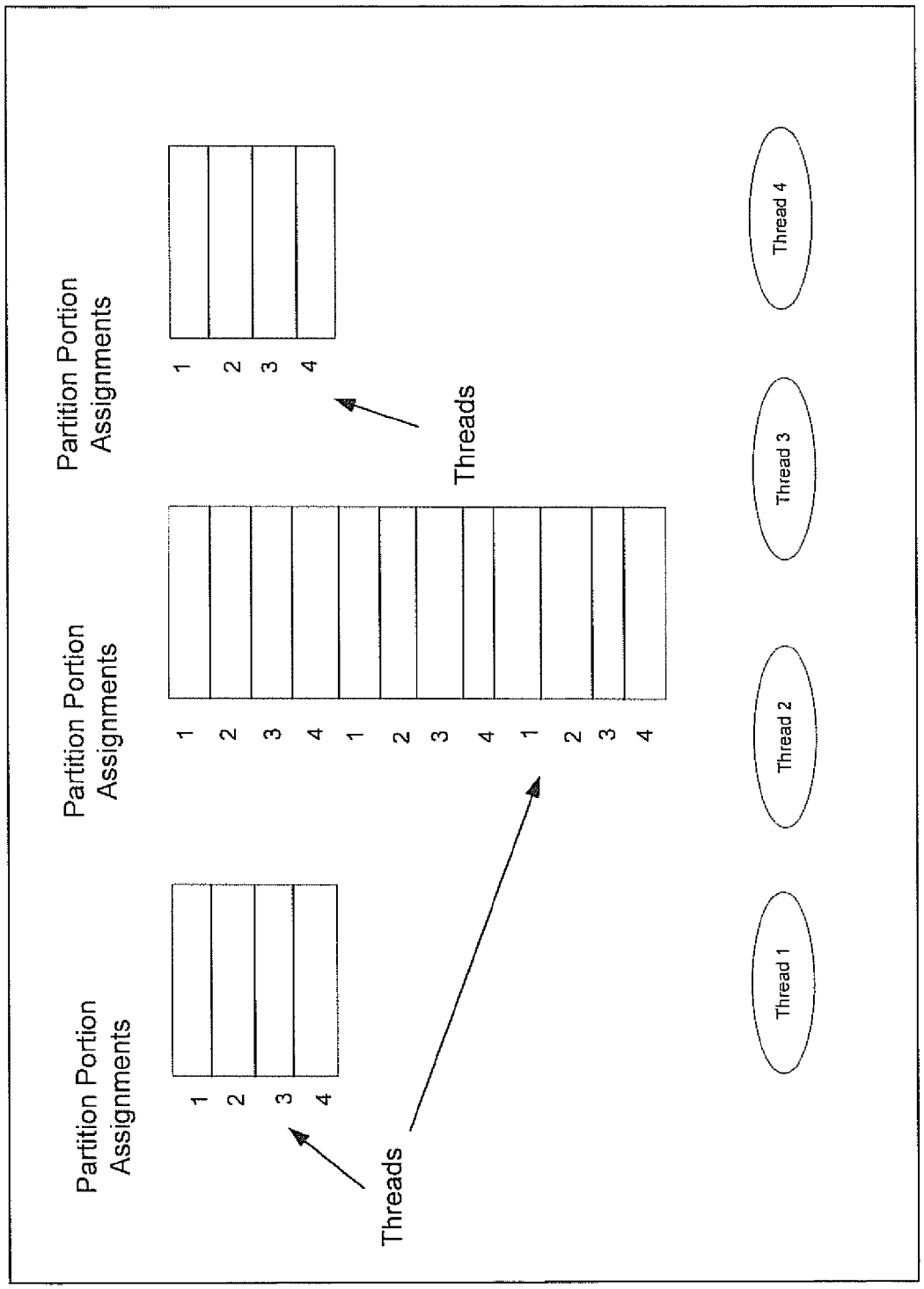
FIG. 2E illustrates the manner in which portions of partitions can be assigned to a plurality of threads that contribute to a parallel scan according to one embodiment.

Parallel partitioned table scans involve the parallel scanning of a plurality of partitions of a data table. In one embodiment, a parallel partitioned table scan is conducted by having each of the threads involved in the parallel scan execute scans of assigned portions of an individual partition of a set of partitions before proceeding to assigned portions of the next partition to be scanned as illustrated in FIG. 2E. FIG. 2E illustrates the manner in which portions of partitions 1, 2, and 3 can be assigned to a plurality of threads (e.g., threads 1, 2, 3, and 4) that contribute to a parallel scan. In the FIG. 2E embodiment, thread assignments are shown as being sequential for purposes of clarity and brevity, however in other embodiments, thread assignments may not be sequential and may be in any order.

Figure 2F:
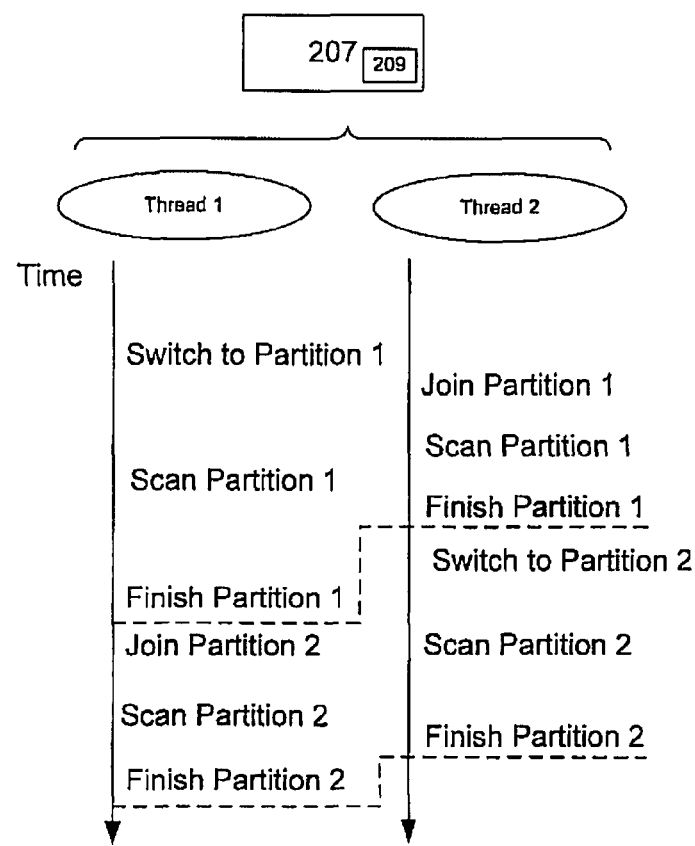
FIG. 2F illustrates the manner in which a parallel partitioned table scan involving the parallel scanning of two partitions of a data set by two threads is executed according to one embodiment.

FIG. 2F illustrates the manner in which a parallel partitioned table scan involving the parallel scanning of two partitions, 1 and 2, of a data set by two threads, 1 and 2, is executed according to one embodiment. As illustrated in FIG. 2F, threads participating in the scan, upon completion of the scan of assigned portions of a first partition, immediately proceed to scan assigned portions of the next partition.

Referring to FIG. 2F, the parallel scanning of the data set comprised of partitions 1 and 2 is initiated when thread 1 commences a scan of its assigned portion of partition 1 (see Switch to Partition 1 in FIG. 2F). Subsequently, thread 2 commences a scan of its assigned portion of partition 1 (see Join Partition 1 in FIG. 2F). In the example illustrated in FIG. 2F, thread 2 completes the scan of its assigned portion of partition 1 prior to the time at which thread 1 completes the scan of its assigned portion of partition 1.

Upon completing the scan of its assigned portion of partition 1, thread 2 immediately commences a scan of its assigned portion of partition 2 (see Switch to Partition 2 in FIG. 2F). Thereafter, upon completing the scan of its assigned portion of partition 1, thread 1 immediately commences a scan of its assigned portion of partition 2 (see Join Partition 2 in FIG. 2F). In the FIG. 2F example, thread 2 completes the scan of its assigned portion of partition 2 prior to the time at which thread 1 completes the scan of its assigned portion of partition 2. The parallel scanning of the data set is completed when thread 1 completes the scan of its assigned portion of partition 2.

As it regards parallel scans of partitioned tables, instead of assigning partitions to threads, a parallel scan of one partition at a time by each participating thread is performed. Importantly, all threads scan a single partition until there is no more data remaining to be assigned from that partition to individual threads. At this point, such individual threads can move to the next partition and commence a scan of the next partition as illustrated in FIG. 2F. As shown, other threads can later join the scan of that partition.

Advantages of one embodiment include performance not being dependent on having more partitions than threads. Moreover, the number of partitions does not have to be an even multiple of the number of threads (so as to avoid non-utilization of a thread). Additionally, data skew (e.g., a mix of small and large partitions) does not negatively impact performance as the contributing threads are utilized on each partition whether small or large. Also, in one embodiment, a parallel partitioned table scan preserves data order when the table is partitioned using an order preserving function such as range partitioning on the leading index key. In one embodiment, a merging operation can be employed to interleave rows from each thread participating in the parallel scan into the correct order.

By enabling truly parallel scans of partitioned tables and by enabling threads to begin scanning the next range or partition without waiting for all threads to finish scanning the prior range or partition, uniform or nearly uniform performance can be achieved. Moreover, a truly parallel scan of a partitioned index can return data from the index in sorted order.

Parallel Range Scan of a Partitioned Table

Figure 2G:
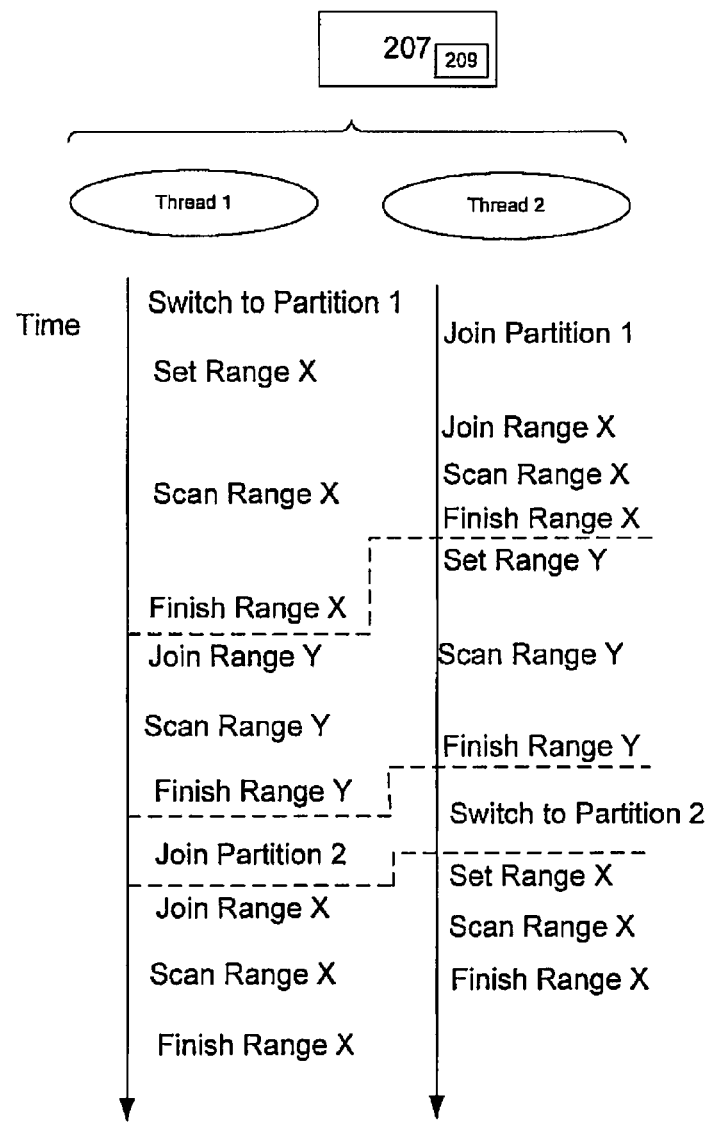
FIG. 2G illustrates the manner in which a parallel range scan over a partitioned table involving the parallel scanning of two partitions and two ranges is executed according to one embodiment.

FIG. 2G illustrates the manner in which a parallel range scan over a partitioned table involving the parallel scanning of two partitions, 1 and 2, where partition 1 contains ranges X and Y, and where partition 2 contains range X, by two threads, 1 and 2, is executed according to one embodiment. As illustrated in FIG. 2G, threads 1 and 2, upon completion of the scan of assigned portions of one or more ranges of a first partition, immediately proceed to scan assigned portions of one or more ranges of the second partition.

Referring to FIG. 2G, the parallel scanning of the data set comprised of partitions 1 and 2 is initiated when thread 1 commences a scan of its assigned portion of partition 1 which includes portions of the therein contained ranges X and Y. Subsequently, thread 2 commences a scan of its assigned portion of partition 1 which likewise includes portions of the therein contained ranges X and Y. In the example illustrated in FIG. 2G, thread 2 completes the scan of its assigned portions of ranges X and Y of partition 1 prior to the time at which thread 1 completes the scan of its assigned portions of ranges X and Y of partition 1. It should be appreciated that thread 2 does not wait for thread 1 to complete scanning its assigned portion of range X of partition 1 before it commences its scan of its assigned portion of range Y of partition 1. The completion by thread 2 of the scan of its assigned portions of ranges X and Y of partition 1 completes its scan of partition 1.

Upon completing the scan of its assigned portion of partition 1, thread 2 immediately commences a scan of its assigned portion of partition 2 which includes a portion of the therein contained range X. Thereafter, upon completing the scan of its assigned portion of partition 1, thread 1 immediately commences a scan of its assigned portion of partition 2 which likewise includes a portion of the therein contained range X. In the FIG. 2G example, thread 2 completes the scan of its assigned portion of partition 2 prior to the time at which thread 1 completes the scan of its assigned portion of partition 2. Consequently, the parallel scan of the data set is completed when thread 1 completes its scan of partition 2.

As shown in FIG. 2G, in a parallel range scan over a partitioned table, whenever a thread reaches the end of a range, and there are more ranges remaining, the thread immediately moves to the next range. However, where no ranges remain in the first partition, but there are more partitions remaining to be scanned, the thread can immediately move to the first range of the next partition. As illustrated in the scanning methodology described herein, waiting for threads to complete scans is avoided.

In one embodiment, as shown in the above discussion, the non-blocking parallel scan methodology described herein can be applied when both multiple ranges and multiple partitions are involved in a scanning job. In FIG. 2G, each range is scanned once for each partition. However, in other embodiments, each partition can be scanned once for each range. Moreover, in one embodiment, the number of ranges per partition can vary for each partition (the number of partitions per range can vary as well).

Skipping Ranges or Partitions

Figure 2H:
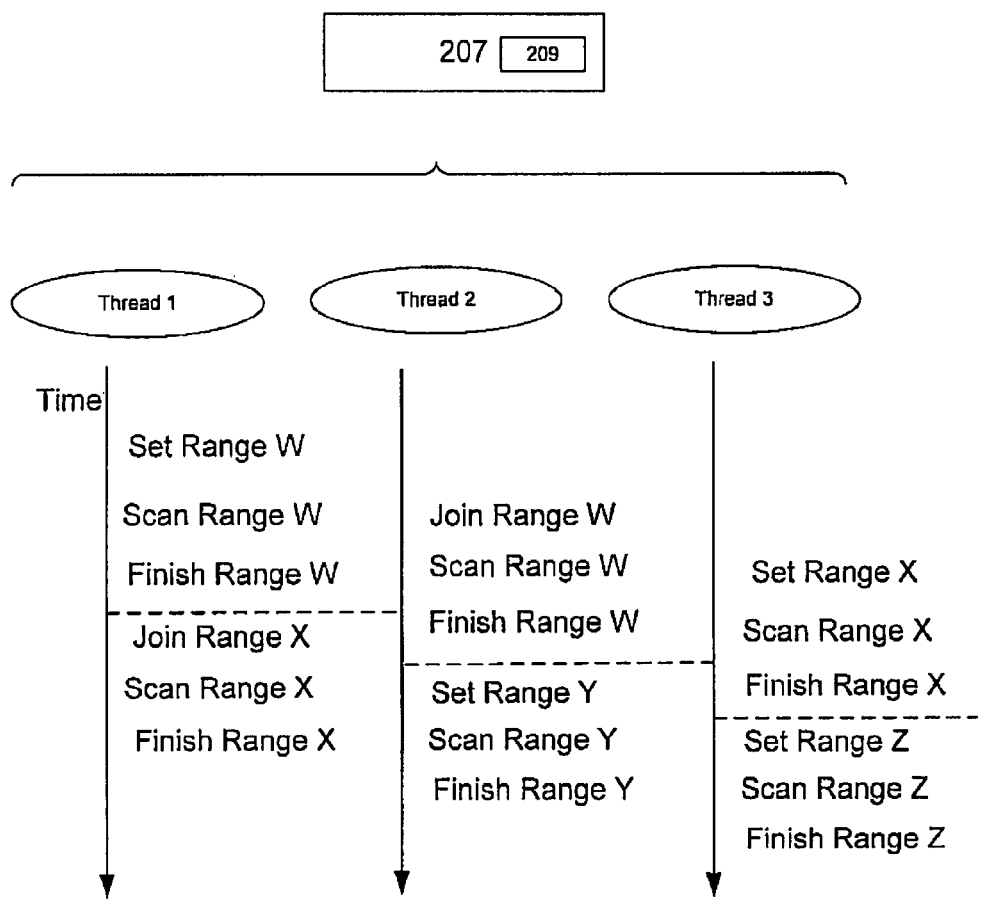
FIG. 2H illustrates how threads in a parallel scan can "skip" or "miss" an entire range or partition according to one embodiment.

In one embodiment, if ranges or partitions involved in a parallel scan are small, it is possible that some threads can "skip" or "miss" an entire range or partition as is illustrated in FIG. 2H. This scenario is especially likely when there are larger numbers of threads and can occur if all of the pages in a range or partition have already been assigned to other threads by the time a thread attempts to join a scan. If a thread is presented with this condition, it immediately initiates a scan of the next available range or partition. This is illustrated in FIG. 2H where it is shown that thread 2 skips range X and thread 3 skips range Y and range W because pages in these respective ranges have already been assigned by the time that the scan by thread 2 and thread 3 of other assigned ranges is completed.

Referring to FIG. 2H, when thread 2 completes its scan of range W, all of the pages in range X have already been assigned. As shown in FIG. 2H, in this situation, thread 2 immediately initiates a scan of the next available range, which is range Y. Similarly, when thread 3 completes its scan of range X, all of the pages in range Y have already been assigned. As shown in FIG. 2H, in this situation thread 3 immediately initiates a scan of the next available range, which is range Z. Thread 1 scans ranges W and X. Note that in this scenario it is also possible that more than two ranges or partitions can be in the process of being scanned at once. It should be appreciated that the entire discussion made with reference to FIG. 2H applies equally well to partitions, as some threads can skip partitions for similar reasons.

Figure 3:
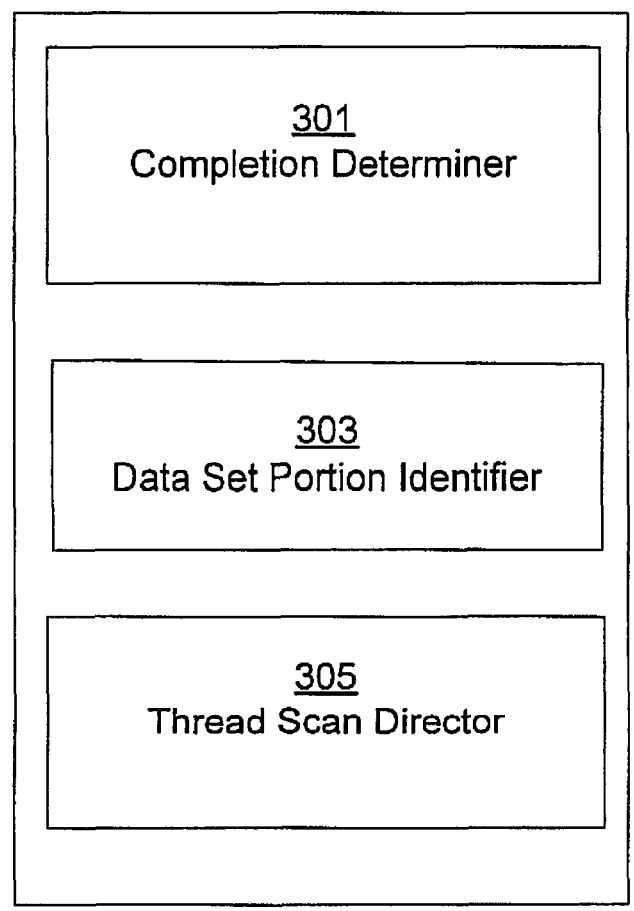
FIG. 3 shows components of a system for executing non-blocking parallel scans according to one embodiment.

Components of System for Executing Non-Blocking Parallel Scans According to Embodiments FIG. 3 shows components of a system 209 for executing non-blocking parallel scans according to one embodiment. The components of system 209 implement an algorithm for executing non-blocking parallel scans. In the FIG. 3 embodiment, system 209 includes completion determiner 301, data set portion identifier 303 and thread scan director 305.

It should be appreciated that aforementioned components of system 209 can be implemented in hardware or software or in a combination of both. In one embodiment, components and operations of system 209 can be encompassed by components and operations of one or more computer programs (e.g., database management system 207 in FIG. 2A). In another embodiment, components and operations of system 209 can be separate from the aforementioned one or more computer programs but can operate cooperatively with components and operations thereof. In one embodiment, system 209 can be implemented as a part of the code underlying the threads discussed herein (such as with reference to FIGS. 2A-2H).

Referring to FIG. 3, completion determiner 301 determines if threads have completed scanning assigned portions of a division (e.g., a range, a partition) of a data set. In one embodiment, a data set can be a data table of a database. In other embodiments, a data set can be another type of database data grouping. In one embodiment, a division of a data set can include a range of data from the data set. In another embodiment, a division of a data set can include a partition of data from the data set.

Data set portion identifier 303 (optional) identifies portions of the next division of a data set to be scanned that are available for scanning by a thread identified as having completed assigned scans in another division. In one embodiment, upon their completion of assigned scans in one division, threads scan assigned portions of another division that have been identified by data set identifier as available.

Thread scan director 305 directs threads to immediately scan identified portions of the next division of the data set to be scanned that are available for assignment. In one embodiment, the threads can commence their scan free of a need to wait until other threads complete scanning their assigned portions of a division of a data set. In one embodiment, these operations can be supported by a read-ahead system that can pre-fetch data from divisions of the data set that are to be scanned.

Figure 4:
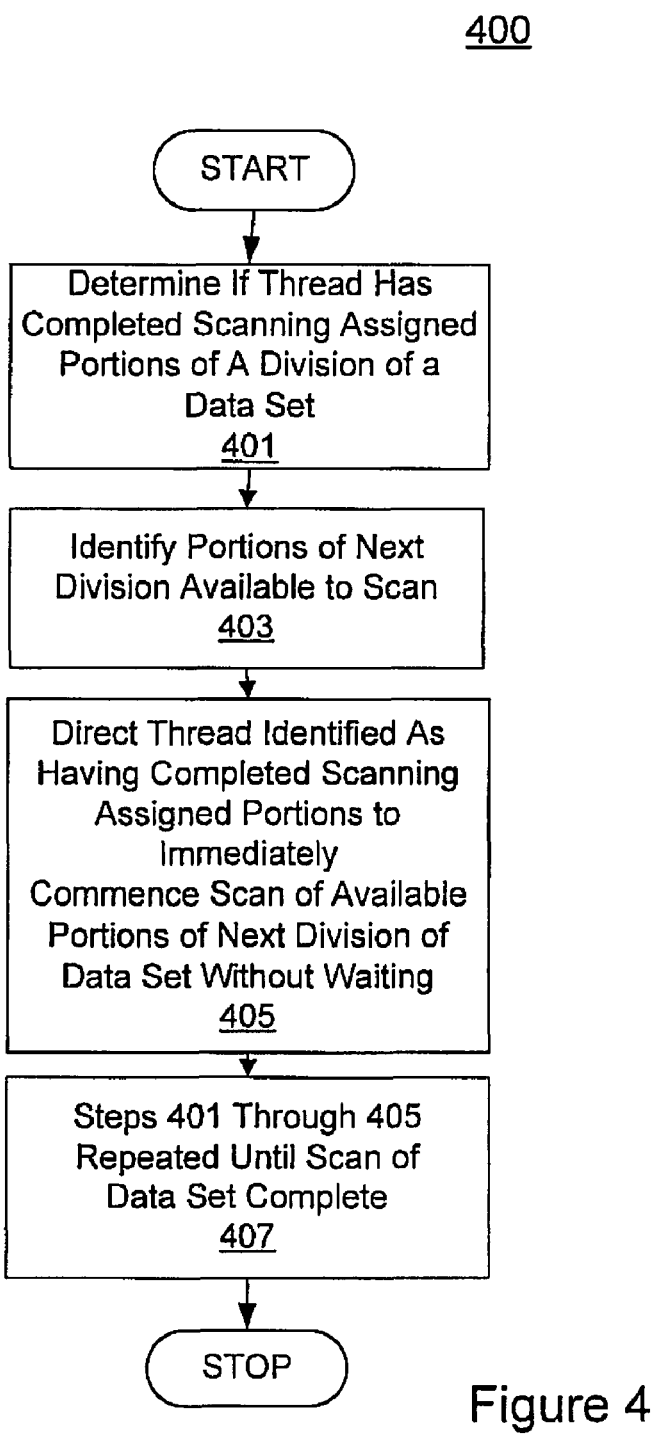
FIG. 4 shows a flowchart of the steps performed in a system for executing non-blocking parallel scans according to one embodiment.

Exemplary Operations of System for Executing Non-Blocking Parallel Scans According to Embodiments FIG. 4 shows a flowchart 400 of the steps performed in a method for executing non-blocking parallel scans according to one embodiment. The flowchart includes processes that, in one embodiment, can be carried out by processors and electrical components under the control of computer-readable and computer-executable instructions. Although specific steps are disclosed in the flowcharts, such steps are exemplary. Moreover, embodiments are well suited to performing various other steps or variations of the steps recited in the flowcharts. Within various embodiments, it should be appreciated that the steps of the flowcharts can be performed by software, by hardware or by a combination of both.

Referring to FIG. 4, at step 401, it is determined if a thread has completed scanning assigned portions of a division of a data set (e.g., range, partition). In one embodiment, a completion determiner (e.g., 301 in FIG. 3) determines if a thread has completed scanning assigned portions of a division (e.g., a range, a partition) of a data set.

At step 403 (optional), portions of the next division of the data set to be scanned that are available to be scanned by the thread identified in step 401 is identified. In one embodiment, a data set portion identifier (e.g., 303 in FIG. 3) identifies portions of the next division of the data set to be scanned that are available for scanning. In one embodiment, upon their completion of assigned scans in one division, threads can be assigned portions of another division to scan that have been identified by the data set identifier.

At step 405, a thread identified as having completed assigned scans in one division is directed to immediately scan assigned portions of the next division to be scanned. In one embodiment, a thread scan director (e.g., 305 in FIG. 3) directs threads to immediately, and free of the need to wait until other threads complete scanning assigned portions of a current division being scanned, commence the scan of assigned portions of a next division of a data set to be scanned upon completing a scan of assigned portions of a previous division. And, at step 407, steps 401 through 405 are repeated until a scan of the entire data set is complete.

Exemplary Hardware According to One Embodiment

Figure 5:
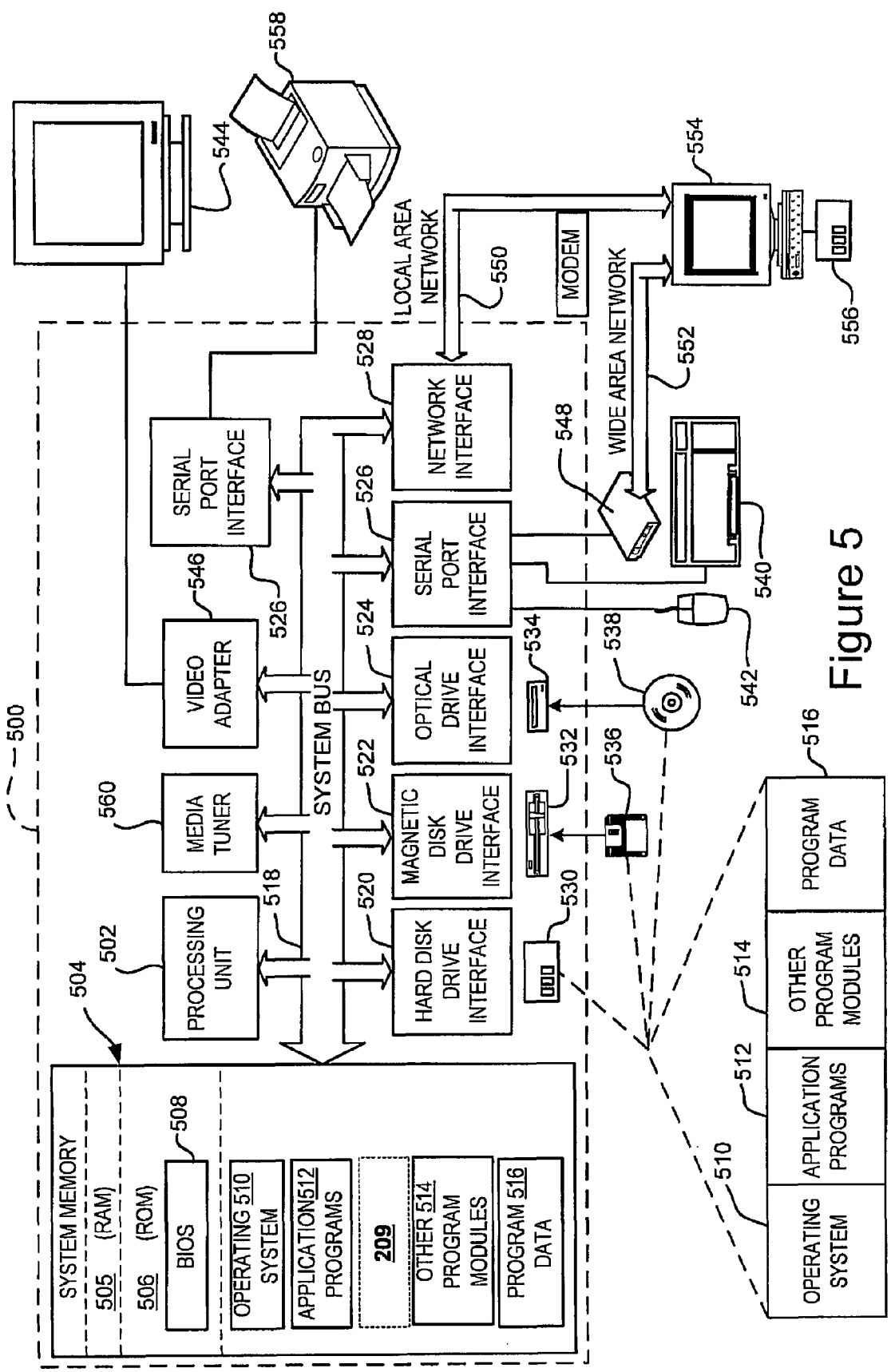
FIG. 5 shows an exemplary hardware operating environment according to one embodiment.

FIG. 5 shows an exemplary hardware operating environment according to one embodiment. As discussed with reference to FIG. 2A, network server 203 and client computer systems 201a-201n can comprise computing devices. Moreover, a computing device as disclosed herein can encompass a computer 500 that includes a processing unit 502, a system memory 504 and a system bus 518 that operatively couples various system components including the system memory 504 to the processing unit 502. In one embodiment, there can be one or more processing units (e.g., 502), such that processing unit 502 can comprise a single central processing unit (CPU), or a plurality of processing units (e.g., a parallel processing environment). In one embodiment, computer 500 may be a conventional computer, a distributed computer, or any other type of computer.

The system bus 518 can be any of several types of bus structures including a memory bus or memory controller, a peripheral bus, a switched fabric, point-to-point connections, and a local bus using any of a variety of bus architectures. The system memory 504 can include read only memory (ROM) 506 and random access memory (RAM) 505. A basic input/output system (BIOS) 508, containing the basic routines that help to transfer information between elements within the computer 500, such as during start-up, can be stored in ROM 506. The computer 500 can further include a hard disk drive 530 for reading from and writing to a hard disk, not shown, a magnetic disk drive 532 for reading from or writing to a removable magnetic disk 536, and an optical disk drive 534 for reading from or writing to a removable optical disk 538 such as a CD ROM, DVD, or other optical media.

As shown in FIG. 5, the hard disk drive 530, magnetic disk drive 532, and optical disk drive 534 can be connected to the system bus 518 by a hard disk drive interface 520, a magnetic disk drive interface 522, and an optical disk drive interface 524, respectively. In one embodiment, the drives and their associated computer-readable media provide nonvolatile storage of computer-readable instructions, data structures, program modules and other data for the computer 500. It should be appreciated by those skilled in the art that any type of computer-readable media that can store data that is accessible by a computer, for example, magnetic cassettes, flash memory cards, digital video disks, RAMs, and ROMs, can be used in the exemplary operating environment shown in FIG. 5.

A number of program modules can be stored on hard disk 530, magnetic disk 532, optical disk 534, ROM 506, or RAM 505, including an operating system 510, one or more application programs 512, (e.g., a multimedia software package, database management system 207 and system 209 in FIG. 2A etc., see FIG. 5) other program modules 514, (e.g., a visualization engine, an audio/video decoder, a UI generator and a metadata decoder) and program data 516 (e.g., media content). Moreover, a user can enter commands and information into the computer 500 through input devices such as a keyboard 540 and a pointing device 542 (e.g., a mouse). Other input devices (not shown) can include but are not limited to a microphone, a joystick, a game pad, a tablet, a touch screen device, a satellite dish, a scanner, a facsimile machine, and a video camera. These and other input devices are often connected to processing unit 502 through a serial port interface 526 that is coupled to system bus 518, but can be connected by other interfaces, such as a parallel port, a game port, or a universal serial bus (USB).

A monitor 544 or other type of display device can also be connected to system bus 518 via an interface, such as a video adapter 546. In addition to monitor 544, computers typically include other peripheral output devices, such as a printer (e.g., 558) and speakers (not shown). These and other output devices can be connected to processing unit 502 through a serial port interface 526 that is coupled to system bus 518, but can be connected by other interfaces, such as parallel port, game port, or universal serial bus (USB). In the case of a media server, a tuner 560 can also be connected with system bus 518 in order to receive and convert analog content signals into digital format and similarly convert digital content into analog signals for transmission to connected devices.

Computer 500 can operate in a networked environment using logical connections to one or more remote computers, such as remote computer 554. These logical connections can be achieved by means of a communication device that can be coupled to or integral with computer 500. It should be appreciated that the invention is not limited to a particular type of communications device. Remote computer 554 can be another computer, a server, a router, a network personal computer, a client, a peer device, or other common network node, and can include many or all of the elements described above relative to computer 500, although only a memory storage device 556 is illustrated in FIG. 5. It should be appreciated that the logical connections depicted in FIG. 5 can include a wired or wireless local-area network (LAN) 550, for example, an Ethernet network, or a WiFi network, and a wide-area network (WAN) 552, for example, a cable network or a telephony network. Such networking environments are commonplace in office networks, enterprise-wide computer networks, intranets and the Internet, which are all types of networks.

In one embodiment, when employed in a LAN 550 environment, computer 500 can be connected to local network 550 through a network interface or adapter 528, which is a type of communications device. Moreover, when employed in a WAN 552 environment, computer 500 can include a modem 548, a network adapter, or any other type of communications device for establishing communications over the wide area network 552. The modem 548, which can be internal or external, can be connected to the system bus 518 via the serial port interface 526. In a networked environment, program modules depicted relative to the personal computer 500, or portions thereof, can be stored in a remote memory storage device. It is appreciated that the network connections shown are exemplary and other means of establishing a communications link between the computers can be used.

With reference to exemplary embodiments thereof, executing non-blocking scans is disclosed. One embodiment includes identifying one or more threads that have completed scanning one or more assigned portions of a first division of the data set. In addition, one or more portions of another division of the data set are identified as being available for scanning by the one or more threads. The identified one or more threads are directed to immediately scan the portions of the data set that are identified as available for scanning, upon completing the scanning of assigned portions of the first division of the data set.

The foregoing descriptions of specific embodiments have been presented for purposes of illustration and description. They are not intended to be exhaustive or to limit the subject matter to the precise forms disclosed, and obviously many modifications and variations are possible in light of the above teaching. The embodiments were chosen and described in order to best explain the principles of the disclosed subject matter and its practical application, to thereby enable others skilled in the art to best utilize the disclosed subject matter and various embodiments with various modifications as are suited to the particular use contemplated. It is intended that the scope of the disclosed subject matter be defined by the Claims appended hereto and their equivalents.

What is claimed is:

1. A method for executing non-blocking parallel scans of data sets of an electronic database, comprising:
   (a) using a processor, determining if one or more threads of a plurality of threads participating in a parallel scan of a division of a plurality of divisions of a data set of said electronic database, has completed scanning one or more assigned portions of a said division of said data set of said electronic database;
   (b) using a processor, directing said one or more threads to immediately scan one or more portions of a next division of said data set of said electronic database, free of a need to wait until other threads complete scanning assigned portions of said division of said data set of said electronic database, and repeating steps (a) and (b) until the scanning of said data set of said electronic database is completed; and
   (c) using a processor, executing a read-ahead operation involving said next division that is performed without waiting for said one or more threads to complete scanning a division of said data set of said electronic database.

2. The method of claim 1, wherein said one or more threads skip participation in a scan of one or more of said plurality of divisions if all portions of said one or more of said plurality of divisions have already been assigned.

3. The method of claim 1, wherein said data set comprises an index wherein said parallel scan returns data in a sorted order.

4. The method of claim 1, wherein a plurality of divisions that must be scanned are predetermined so that a read-ahead that completes one division proceeds to a next division without delay.

5. The method of claim 1, wherein one or more portions of a division to be scanned is dynamically determined when a read-ahead reaches the end of a current division.

6. The method of claim 1, wherein said data set is a table of data from an electronic database.

7. The method of claim 1, wherein said division of said data set comprises ranges of data or partitions of data from a table of data.

8. A computer readable medium having computer-executable components stored therein comprising:
   a completion determining component for determining if one or more threads of a plurality of threads participating in a parallel scan of a subset of a plurality of subsets of a data set of an electronic database, has completed scanning one or more assigned portions of said subset;

a scan initiating component for causing said one or more threads to immediately scan one or more portions of another subset of said data set upon completing said scanning of said one or more assigned portions of said subset, free of a need to wait until other threads complete scanning assigned portions of said subset; and a read-ahead performing component for performing a read-ahead operation involving said another subset that is performed without waiting for said one or more threads to complete scanning said first subset of said data set.

9. The medium of claim 8, wherein said plurality of threads scan successive subsets of said data set.

10. The medium of claim 8, wherein said data set comprises an index wherein said parallel scan returns data in a sorted order.

11. The medium of claim 8, wherein a plurality of subsets that must be scanned are predetermined so that a read ahead that completes one subset proceeds to a next subset without delay.

12. The medium of claim 8, wherein one or more portions of a subset to be scanned is dynamically determined when a read-ahead reaches the end of a current subset.

13. The medium of claim 8, wherein said data set is a table of data from a database.

14. The medium of claim 8, wherein said subsets of said data set comprise ranges of data or partitions of data from a table of data.

15. An apparatus comprising:

a computer readable memory unit; and a processor coupled to said memory unit, said processor for causing one or more threads participating in a parallel scan of a first subset of a plurality of subsets of a data set of an electronic database to immediately scan one or more portions of a next subset of said data set upon completing scanning of one or more assigned portions of said first subset of said data set free of a need to wait until other threads complete scanning assigned portions of said first subset of said data set, and performing a read-ahead operation involving said second subset that is performed without waiting for said one or more threads to complete scanning said first subset of said data set.

16. The apparatus of claim 15, wherein said one or more threads perform a parallel scan of successive subsets of said data set.

17. The apparatus of claim 15, wherein said data set comprises an index and said parallel scan returns data in a sorted order.

* * * * *